(12) United States Patent
Horii et al.

(10) Patent No.: US 8,976,416 B2
(45) Date of Patent: Mar. 10, 2015

(54) IMAGE PROCESSING APPARATUS AND METHOD THEREOF

(75) Inventors: Hiroyuki Horii, Kawasaki (JP); Hisashi Ishikawa, Urayasu (JP); Koji Moriya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1361 days.

(21) Appl. No.: 12/140,074

(22) Filed: Jun. 16, 2008

(65) Prior Publication Data

US 2009/0002766 A1 Jan. 1, 2009

(30) Foreign Application Priority Data

Jun. 18, 2007 (JP) ................................ 2007-160682

(51) Int. Cl.
*H04N 1/40* (2006.01)
(52) U.S. Cl.
CPC ............. *H04N 1/40* (2013.01); *H04N 1/40081* (2013.01)
USPC ...................................................... 358/3.01
(58) Field of Classification Search
USPC ................ 358/1.8, 502, 3.01, 3.1, 3.09, 3.21; 347/5, 41
See application file for complete search history.

(56) References Cited

U.S. PATENT DOCUMENTS

| 6,286,926 | B1 * | 9/2001 | Hirabayashi et al. | 347/17 |
|---|---|---|---|---|
| 6,874,864 | B1 * | 4/2005 | Maeda et al. | 347/41 |
| 7,393,078 | B2 * | 7/2008 | Yazawa et al. | 347/19 |
| 7,513,589 | B2 * | 4/2009 | Eldar et al. | 347/15 |
| 2011/0122178 | A1 * | 5/2011 | Goto et al. | 347/9 |

FOREIGN PATENT DOCUMENTS

| JP | 2001-063014 A | 3/2001 |
|---|---|---|
| JP | 2004-209943 A | 7/2004 |
| JP | 2006-305993 A | 11/2006 |

* cited by examiner

*Primary Examiner* — Vincent Rudolph
*Assistant Examiner* — Lawrence Wills
(74) *Attorney, Agent, or Firm* — Canon USA Inc. IP Division

(57) ABSTRACT

In a case in which image data used to form an image on a recording medium in a plurality of scans performed across a recording area of the recording medium is generated, a coefficient determination unit determines assignments of output density for the scans on the basis of density characteristics corresponding to the type of recording medium indicated by a recording-medium signal. Multipliers and binary conversion units generate image data for the scans from input image data on the basis of the assignments of the output density.

10 Claims, 14 Drawing Sheets

IMAGE PROCESSING APPARATUS AND METHOD THEREOF

BACKGROUND OF THE INVENTION

1. Field of the Invention

The present invention relates to an image processing apparatus and a method thereof.

2. Description of the Related Art

Inkjet printers generate print data by converting multilevel data concerning an input image into binary data by using, for example, an error diffusion method. After the print data to be printed by means of a printhead is generated, in order to consider characteristics of the printhead and suppress deviations caused by mechanism control, multipass printing is performed. In such multipass printing, data that can be printed in one scan across a recording medium is divided into a plurality of data groups and the data groups are printed in a plurality of scans across the recording medium. In the multipass printing, a mask pattern for passes is prepared in advance. By performing logical multiplication of the mask pattern and the print data, the print data can be distributed among the data groups for a plurality of scans across the recording medium (hereinafter referred to as pass distribution processing). Such a mask pattern is designed to allow all the print data to be output in a plurality of scans across the recording medium.

In the mask pattern, predetermined printable dots are assigned to each of the passes, assuming that all printable dots represent 100%. Printable dots assigned to a pass are not included in the other passes. The logical sum of printable dots of all the passes is equal to the entirety of a print area. Thus, the mask pattern is designed to be a pattern having a maximum degree of randomness. In addition, the mask pattern is designed in a manner such that the generated print data is basically equally distributed among a plurality of scans across the recording medium. This is performed in order to cause the print data obtained by performing image processing on an input image to be printed equally among the passes.

FIG. 1 is a diagram showing a pixel lattice, ink droplets, and print duties on a recording medium.

Referring to FIG. 1, broken lines represent a lattice, and circles represent ink droplets that have landed on the recording medium. Numbers on the left of the drawing represent print duties. A print duty of 100% represents a state in which ink is to be ejected onto all pixels of the lattice. Here, in FIG. 1, the ink droplets are arranged so as to help understanding of relationships between the print duties and the ink droplets, and thus the ink droplets are not always required to be arranged as shown in FIG. 1.

As shown in FIG. 1, the ink droplets are larger in size than the pixels. Each of the pixels has a rectangular shape and each of the ink droplets, which has landed on and been absorbed into the recording medium, has an approximately circular shape. If printing is performed with a print duty of 100%, the surface of the recording medium needs to be completely covered with ink droplets. Thus, the ink droplet needs to be at least as large as a circumcircle of the pixel.

In actual printing, a mechanical system including, for example, a paper feed mechanism and a printhead-moving mechanism is involved. Thus, the mechanical system may cause more than a little deviation due to mechanism control. Moreover, the printhead also may cause a deviation when ink is ejected. In order to perform stable printing despite such deviations, ink droplets need to be set to be large in size compared with pixels.

Here, even though the same amount of ink is ejected, the size of an ink droplet on a recording medium varies according to a combination of the ink and recording medium used. In general, when an inkjet printer is used, the type of ink is fixed by setting an ink tank inside the body of the inkjet printer. In accordance with the purpose of performing printing, a recording medium is selected from among normal paper and various types of dedicated recording paper. Thus, in a case in which the type of ink is fixed, the size of an ink droplet on a recording medium varies according to the type of recording medium.

The reason that the ink droplet shown in FIG. 1 is larger in size than the pixel is described above. Next, when printing is performed with ink droplets that are larger in size than pixels, the way in which the ink droplets cover a recording medium in a case in which a print duty gradually increases will be described.

If printing is performed with a print duty of 12.5% or 25% as shown in the upper part of FIG. 1, adjacent ink droplets do not overlap each other. However, if printing is performed with a print duty of 37.5%, adjacent ink droplets overlap each other, and if printing is performed with a print duty of 50%, most of a recording medium is covered with ink droplets. The proportion of the recording medium covered by ink droplets is hereinafter referred to as "coverage".

FIG. 2 is a graph of ink-droplet coverage versus print duty. The horizontal axis represents the print duty, and the vertical axis represents the coverage. Here, FIG. 2 is a graph in a case in which the ratio between the size of a pixel and that of an ink droplet is fixed for illustrative purposes as an example, and thus this ratio does not have to be used in an actual printer.

There is a strong relationship between ink-droplet coverage and output density although the relationship is affected by the type of recording medium. Therefore, the following description will be made in terms of ink-droplet coverage instead of output density.

As shown in FIG. 2, when the print duty is 50%, the coverage greatly exceeds 90%. If the print duty is over 50%, since little space is left, no matter how much ink is ejected, the coverage does not increase. Some recording media have a thick ink-absorbing layer, allowing printing to be performed even if a print duty is over 100% on such recording media. Moreover, output density may be increased on some recording media in response to the amount of ejected ink droplets. With respect to such recording media, however, the output density for a print duty between 50% and over 100% increases slower than the output density for a print duty between 0 and 50%.

It has been mentioned that there is a strong relationship between ink-droplet coverage and output density; however, with respect to output density, the maximum density is determined on the basis of the amount of ink absorbed into a recording medium. Some types of recording paper dedicated to inkjet printers have a coating layer that can absorb a lot of ink, the coating layer being provided on a surface of the recording paper. On such recording paper, output density increases even if a print duty is over 100%. Depending on the type of recording paper, output characteristics change on the basis of the amount of ink absorbed into a recording medium, the spread of ink, or the like.

FIG. 3 is a graph showing a relationship between density of an input image (hereinafter referred to as input density) and output density on a recording medium. As shown in FIG. 3, the relationship between input density and output density is illustrated with not a linear line but a curved line, having a convex shape in the upward direction.

As described above, in pass distribution processing, generated print data is distributed among, for example, four passes by performing logical multiplication of a mask pattern whose pattern is random and the generated print data. Thus, the generated print data is equally distributed among four data groups. That is, this means that if printing is performed with a print duty of 100%, input density is divided into four ranges k1 through k4 shown in FIG. 3 in a manner such that the ranges k1 though k4 have the following relationship, k1:k2:k3:k4=1:1:1:1.

FIGS. 4A though 4D are diagrams used to describe multi-pass printing in which an image is formed on a recording medium by causing a printhead to scan across a recording medium a plurality of times. Here, operations performed in the case of four-pass printing will be described.

A plurality of nozzles are arranged on a printhead 300 along a paper feed direction. A nozzle area 300a indicates an area including the first (the lowest) one-fourth of the nozzles of the printhead 300. Similarly, a nozzle area 300b indicates an area including the second (the second from the lowest) one-fourth of the nozzles of the printhead 300. A nozzle area 300c indicates an area including the third (the third from the lowest) one-fourth of the nozzles of the printhead 300. A nozzle area 300d indicates an area including the last (the highest) one-fourth of the nozzles of the printhead 300.

Printing is repeatedly performed by feeding a recording medium 310 using a paper feed mechanism after the printhead 300 has scanned across the recording medium 310 in a main scanning direction. Referring to FIGS. 4A through 4D, the recording medium 310 is moved upward from the printhead 300, and the printing is repeatedly performed.

FIGS. 4A through 4D illustrate a position of the printhead 300 relative to the recording medium 310.

FIG. 4A illustrates the first scan performed to print a first area 310_1 that is a predetermined area of the recording medium 310. The first area 310_1 corresponds to the nozzle area 300a for a first pass. In the first scan, print data for the first pass among print data for the first area 310_1 is supplied to nozzles included in the nozzle area 300a, and the printhead 300 scans across the recording medium 310 from the right to the left (or from the left to the right). In this way, printing for the first pass is performed in the first area 310_1.

In the first scan, print data is not supplied to nozzles in the nozzle areas 300b through 300d and thus printing is not performed by the nozzles in the nozzle areas 300b through 300d. After the first scan is complete, the recording medium 310 is fed by about one fourth the length of the printhead 300, that is, the length of the nozzle area 300a.

FIG. 4B illustrates the second scan. In FIG. 4B, a current position of the printhead 300 relative to the recording medium 310 is shown, and a printhead 300_1 represented by a broken line indicates the position of the printhead 300 relative to the recording medium 310 in the first scan.

In the second scan, print data for the first pass among print data for a second area 310_2 is supplied to the nozzles included in the nozzle area 300a. At the same time, print data for a second pass among the print data for the first area 310_1 is supplied to the nozzles included in the nozzle area 300b. The printhead 300 scans across the recording medium 310 from the left to the right (or from the right to the left). In this way, printing for the second pass is performed in the first area 310_1, and printing for the first pass in the second area 310_2 is performed.

In the second scan, print data is not supplied to the nozzles in the nozzle areas 300c and 300d since the nozzles have not reached a printing area, and thus printing is not performed by the nozzles in the nozzle areas 300c and 300d. After the second scan is complete, the recording medium 310 is fed by about one fourth the length of the printhead 300, that is, the length of the nozzle area 300a.

FIG. 4C illustrates the third scan. In FIG. 4C, a current position of the printhead 300 relative to the recording medium 310 is shown. The printhead 300_1 represented by a broken line indicates the position of the printhead 300 relative to the recording medium 310 in the second scan and a printhead 300_2 represented by a broken line indicates the position of the printhead 300 relative to the recording medium 310 in the first scan.

In the third scan, print data for the first pass among print data for a third area 310_3 is supplied to the nozzles included in the nozzle area 300a. At the same time, print data for the second pass among the print data for the second area 310_2 is supplied to the nozzles included in the nozzle area 300b. At the same time, print data for a third pass among the print data for the first area 310_1 is supplied to the nozzles included in the nozzle area 300c. The printhead 300 scans across the recording medium 310 from the right to the left (or from the left to the right). In this way, printing for the third pass is performed in the first area 310_1, printing for the second pass is performed in the second area 310_2, and printing for the first pass is performed in the third area 310_3.

In the third scan, print data is not supplied to the nozzles in the nozzle area 300d since the nozzles have not reached the printing area, and thus printing is not performed by the nozzles in the nozzle area 300d. After the third scan is complete, the recording medium 310 is fed by about one fourth the length of the printhead 300, that is, the length of the nozzle area 300a.

FIG. 4D illustrates the fourth scan. In FIG. 4D, a current position of the printhead 300 relative to the recording medium 310 is shown. The printhead 300_1 represented by a broken line indicates the position of the printhead 300 relative to the recording medium 310 in the third scan, the printhead 300_2 represented by a broken line indicates the position of the printhead 300 relative to the recording medium 310 in the second scan, and a printhead 300_3 represented by a broken line indicates the position of the printhead 300 relative to the recording medium 310 in the first scan.

In the fourth scan, print data for the first pass among print data for a fourth area 310_4 is supplied to the nozzles included in the nozzle area 300a. At the same time, print data for the second pass among the print data for the third area 310_3 is supplied to the nozzles included in the nozzle area 300b. At the same time, print data for the third pass among the print data for the second area 310_2 is supplied to the nozzles included in the nozzle area 300c. At the same time, print data for a fourth pass among the print data for the first area 310_1 is supplied to the nozzles included in the nozzle area 300d. The printhead 300 scans across the recording medium 310 from the left to the right (or from the right to the left). In this way, printing for the fourth pass is performed in the first area 310_1, printing for the third pass is performed in the second area 310_2, printing for the second pass is performed in the third area 310_3, and printing for the first pass is performed in the fourth area 310_4.

After the fourth scan is complete, the printing for the first pass performed by the nozzles provided in the nozzle area 300a through the printing for the fourth pass performed by the nozzles provided in the nozzle area 300d are executed in the first area 310_1, and thus image forming for the first area 310_1 is complete.

In this way, when the printhead scans across the recording medium a plurality of times, groups of nozzles, which are different from one another, scan across each of the areas of the recording medium using the print data for the passes, the print data being obtained from the entirety of print data in a distributed manner. This enables, compared with single-pass printing, inconsistencies in the form of streaks generated by deviations due to a paper feed mechanism to be suppressed, and degradation of image quality due to variations in nozzle characteristics (variations in the amount of ejected ink, misdirection of ejected ink droplets, or the like) to be reduced.

In a recording apparatus such as an inkjet printer, the size of a dot formed with an ink droplet and a position where the dot is formed vary due to, for example, variations in the amount of ejected ink and variations in the direction (misdirection) of ejected ink, and thus inconsistencies in density occur in a printed image. In particular, in a serial-type recording apparatus that causes a recording head (a printhead) to scan in a direction different from the array direction of recording elements (nozzles) (direction in which recording elements are arrayed), for example, in a direction orthogonal to the array direction, inconsistencies in density due to the variations described above occur as inconsistencies in the form of horizontal streaks. Thus, the inconsistencies in density tend to be visually noticeable, and cause the quality of a printed image to be lowered.

In general, in inkjet printers, image forming is performed with consideration of, for example, misplacement of dots (landed-dot shift) due to, for example, the above-described misdirection and deviations due to paper feed, and variations in the amount of ejected ink. That is, the image forming is performed using dots smaller than the size represented by recording resolution of image data, and this prevents degradation in image quality due to inconsistencies in the form of streaks and inconsistencies in density.

In order to correct the inconsistencies in density, a method in which one line of dot pattern obtained after halftoning is formed with ink ejected from a plurality of different nozzles has been proposed. This can be achieved by, for example, feeding paper by a length less than the length of the printhead and completing printing of the one line in a plurality of scans (or passes). This method is generally referred to as multipass printing or a multipass recording method, and details thereof has been described above.

As described above, print data is distributed among the passes in a manner such that almost equal numbers of dots are assigned to the passes in pass distribution processing. Thus, as shown in FIG. 3, printing, in which inconsistencies in density are included, performed in the first pass greatly affects output density.

In order to solve this problem, Japanese Unexamined Patent Application Publication No. 2004-209943 discloses a method for appropriately controlling a recording ratio of dots for each pass in response to a density level. In this method, if a density is lower than or equal to a predetermined value, the passes are designed to have an equal recording ratio. If the density is higher than the predetermined value, a recording ratio for the first pass is designed to be reduced, and a recording ratio for the second pass is designed to be increased instead. A recording ratio is controlled using a combination of a threshold table and a mask table. Since a threshold table is utilized, dithering is used as halftoning.

That is, a threshold matrix used for halftoning and a mask pattern used for multipass recording are related to each other. With respect to a group of thresholds included in the threshold matrix, a mask off ratio (for nozzles) for each of scans is controlled to perform appropriate assignment of dots (for the nozzles) for the scan in response to input density.

However, if halftoning is performed by dithering, periodic characteristics due to dithering appear in an output image. Moreover, since a combination of a threshold table and a mask table is used, there is a problem that a determined recording ratio and a dot generation ratio do not always match for some input image data. In addition, it is difficult to generate an arbitrary recording ratio, and it is also difficult to change the threshold table and the mask table in real time.

Furthermore, in general, the size of pixels and the size of ink droplets ejected from the recording head are not equal. By considering, for example, deviations due to mechanism control and recording-head characteristics, as shown in FIG. 1, ink droplets are set to be larger than pixels. Thus, the relationship between the number of ink droplets ejected per unit area (input density) and output density on a recording medium is not linear as shown in FIG. 3.

In multipass printing, if print data is equally distributed among the passes, printing performed in the first pass greatly affects output density and, as a result, printing performed in the second and later passes affects the output density to a lesser degree. For example, in a case in which printing is performed with an input density of 100% in four passes, if the input density is equally distributed among the passes so that they have 25% each, the first 25% of dots are printed in the first pass, and the next 25% of dots are printed in the second pass. Thus, 50% of dots should be printed in the first and second passes. However, as shown in FIG. 2, the coverage of ink droplets has already become over 90% on the recording medium.

In multipass printing, degradation in image quality (inconsistencies in density) due to the errors can be made less noticeable by diffusing various errors (deviations due to a paper feed mechanism, variations in nozzles of the recording head, and the like). However, printing performed in the passes does not equally affect the output density. The printing performed in the first pass most greatly affects the output density. In other words, the errors are not equally diffused in multipass printing.

FIG. 15 is a diagram showing a case in which an image is recorded in two passes.

A recording head 601 includes nozzles for N dots arranged along a sub-scanning direction. A predetermined area 603 is an area in which dots are recorded in the first pass. A predetermined area 604 is an area in which dots are recorded in the second pass. After a scan performed using the recording head 601 is complete in a main scanning direction, a recording medium 602 is fed in the sub-scanning direction by a length corresponding to N/2 dots of the recording head 601, and the recording head 601 can scan again in the main scanning direction. An image is completely printed by repeatedly causing the recording head 601 to scan and feeding the recording medium 602. That is, with respect to a certain area, an image recorded in the second pass is superimposed on an image recorded in the first pass, and the images are combined.

As described above, in the case in which the image is recorded in two passes, even if 50% of dots are formed in the first pass, the coverage of ink droplets greatly exceeds 50% and most of the paper is covered with ink droplets.

In addition, if the recording head 601 performs printing in forward and backward scans along the main scanning direction, the first color used in the forward scan becomes dominant during the forward scan and the first color used in the backward scan becomes dominant during the backward scan. Thus, if the first coloring materials used in the forward and backward scans are different, different color bands are alternately formed for every paper-feed length, and image quality is greatly reduced. This is a type of inconsistency in color. If the amount of ink per unit area ejected from the recording head 601 (a print duty) is increased, the color bands become more noticeable and severe inconsistencies in color can be recognized in an area in which printing is performed using colors with a high print duty. The inconsistencies in color may appear differently according to ink-absorbing characteristics of recording medium.

SUMMARY OF THE INVENTION

In view of the related art described above, an embodiment of the present invention provides an apparatus and the like to disperse errors due to multipass printing.

To this end, embodiments of the present invention, in aspects thereof, provide image processing described below.

In the image processing according to an aspect of the present invention, in a case in which image data used to form an image on a recording medium in a plurality of scans across a recording area of the recording medium is generated, information indicating a type of the recording medium is obtained, assignments of output density to the scans are determined on the basis of density characteristics of the recording medium indicated by the information obtained by the obtaining unit, and image data for the scans is generated from input image data on the basis of the assignments of the output density.

In the image processing according to another aspect of the present invention, in a case in which image data used to form an image on a recording medium in a plurality of scans across a recording area of the recording medium is generated, information indicating a type of the recording medium is obtained, a maximum density value of input image data is obtained, assignments of output density to the scans are determined on the basis of density characteristics of the recording medium indicated by the obtained information and the obtained maximum density value, and image data for the scans is generated from the input image data on the basis of the assignments of the output density.

In the image processing according to another aspect of the present invention, in a case in which image data used to form an image on a recording medium in a plurality of scans across a recording area of the recording medium is generated, information indicating density characteristics of input image data is obtained, assignments of output density for each of pixels included in an image represented by the input image data are determined for the scans according to output density characteristics obtained by using the density characteristics of the input image data indicated by the obtained information, and image data for the scans is generated from the input image data on the basis of the assignments of the output density.

Further features and aspects of the present invention will become apparent from the following description of exemplary embodiments with reference to the attached drawings.

Further features of the present invention will become apparent from the following description of exemplary embodiments with reference to the attached drawings.

DESCRIPTION OF THE EMBODIMENTS

In the following, image processing described in various embodiments of the present invention will be described in detail with reference to the attached drawings.

First Embodiment

Figure 5:
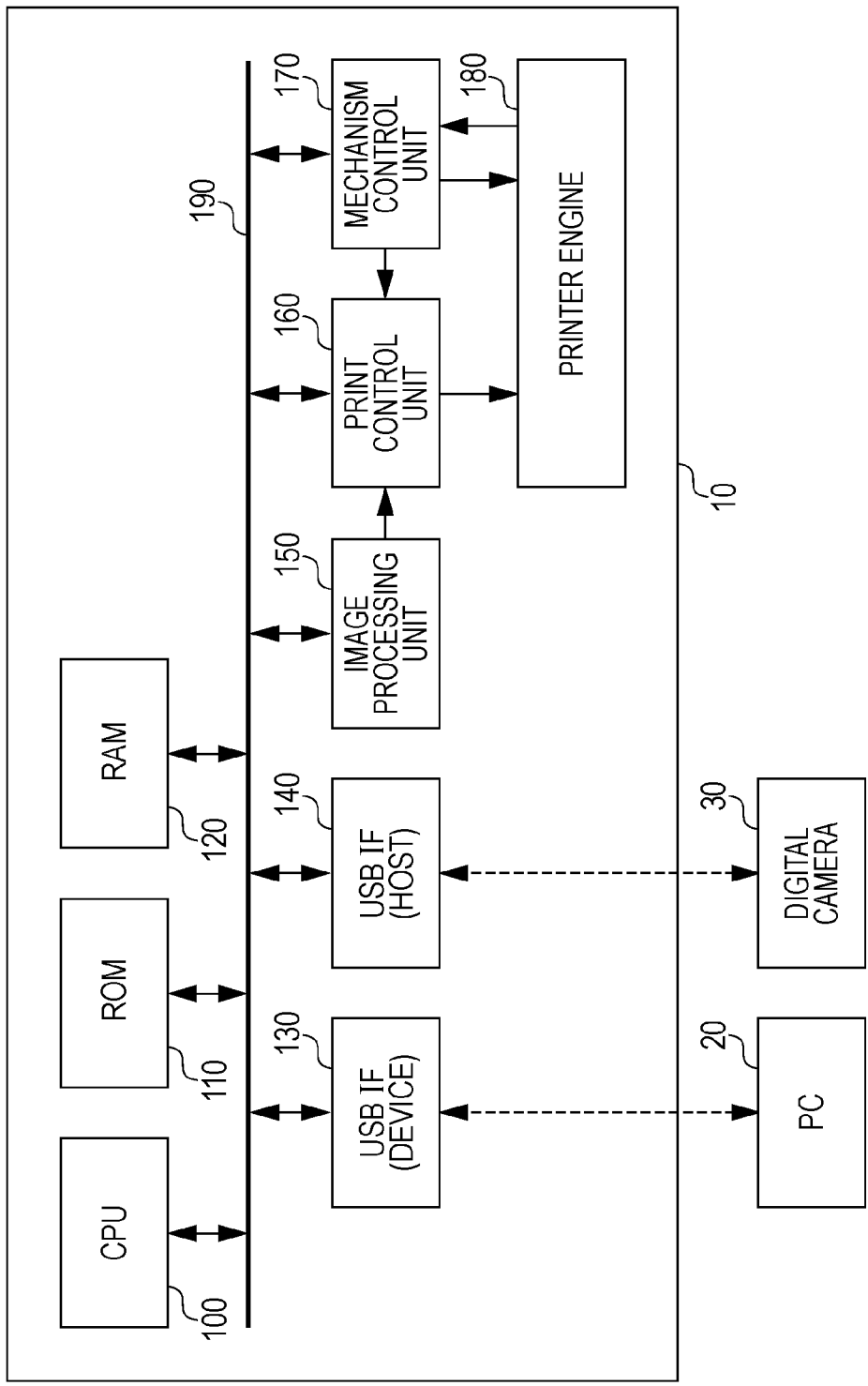
FIG. 5 is a block diagram showing an exemplary structure of a printer according to a first embodiment of the present invention.

FIG. 5 is a block diagram showing an exemplary structure of a printer according to a first embodiment of the present invention.

A personal computer (PC) 20 and a digital camera 30 are connected to a printer 10 via universal serial bus (USB) interfaces (IFs).

A central processing unit (CPU) 100 executes a program stored in a read-only memory (ROM) 110 using a random access memory (RAM) 120 as a work memory, and controls components (described below) via a system bus 190. Various types of data such as table data in addition to the program are stored in the ROM 110.

A USB IF 130 is a USB device interface used to perform communications with the PC 20, which is a USB host. A USB IF 140 is a USB host interface used to perform communications with, for example, the digital camera 30.

An image processing unit 150 performs image processing such as color conversion processing or binary conversion processing on RGB multilevel image data input from the PC 20, the digital camera 30, or the like. A print control unit 160 supplies, to a printhead of a printer engine 180, print data output from the image processing unit 150, and causes printing to be performed. A mechanism control unit 170 controls mechanisms, for example, a paper feed mechanism and a carriage moving mechanism.

Here, halftoning performed by the image processing unit 150 is not limited to the binary conversion processing. In order to print an image represented by multilevel image data, the halftoning may be processing that is used to reduce the number of levels of the multilevel image data and reproduce a halftone image. For example, the halftoning may be N-level conversion processing (N is an integer greater than or equal to two) in which multilevel data is quantized to fewer-bit data. The N-level conversion processing includes, for example, printing performed using light and dark ink, printing performed using large/small ink droplets, and printing performed using large/medium/small ink droplets.

An example in which the printer 10 directly prints an image picked up by the digital camera 30 will be described.

The CPU 100 first detects the type of a recording medium. The CPU 100 reads information regarding the recording medium and determines the type of the recording medium by using a sensor that detects the type of a recording medium, the sensor being set in the printer engine 180. With respect to such a sensor that detects the type of recording medium, for example, a scheme has been proposed. In the scheme, light with a predetermined wavelength is projected and reflected light is received.

Image data picked up by using the digital camera 30 is stored as, for example, joint photographic experts group (JPEG) data in a memory of the digital camera 30. If the digital camera 30 is connected to the USB IF 140 of the printer 10, the JPEG data stored in the memory of the digital camera 30 is supplied via the USB IF 140 and stored in the RAM 120. The CPU 100 causes bitmap data obtained by decompressing the JPEG data received from the digital camera 30 to be stored in the RAM 120.

In order to generate print data from the bitmap data stored in the RAM 120, the CPU 100 controls the image processing unit 150 to execute image processing corresponding to the type of the recording medium. The image processing unit 150 generates print data (dot data) by performing image processing, for example, color conversion or binary conversion processing, on the bitmap data read out from the RAM 120. The image processing unit 150 performs pass distribution processing on the generated print data to obtain data for use in multipass printing, and supplies the data to the print control unit 160. Details of processing performed by the image processing unit 150 will be described below.

The print control unit 160 supplies the print data to the printer engine 180 in synchronization with driving of the printhead on the basis of a signal supplied from the mechanism control unit 170. That is, the print control unit 160 generates ejection pulses in synchronization with operations of the printer engine 180 whose motor or mechanism is controlled by the mechanism control unit 170, and supplies the generated ejection pulses to the printhead of the printer engine 180. The printhead is controlled to eject ink droplets in accordance with the ejection pulses, and reproduces the image picked up by using the digital camera 30 on the recording medium.

Here, it is not always necessary to detect the type of a recording medium by using such a sensor that detects the type of a recording medium. The type of recording medium may be specified or selected by an operation unit, not shown, of the printer 10 or an operation unit, not shown, of the digital camera 30.

Figure 6:
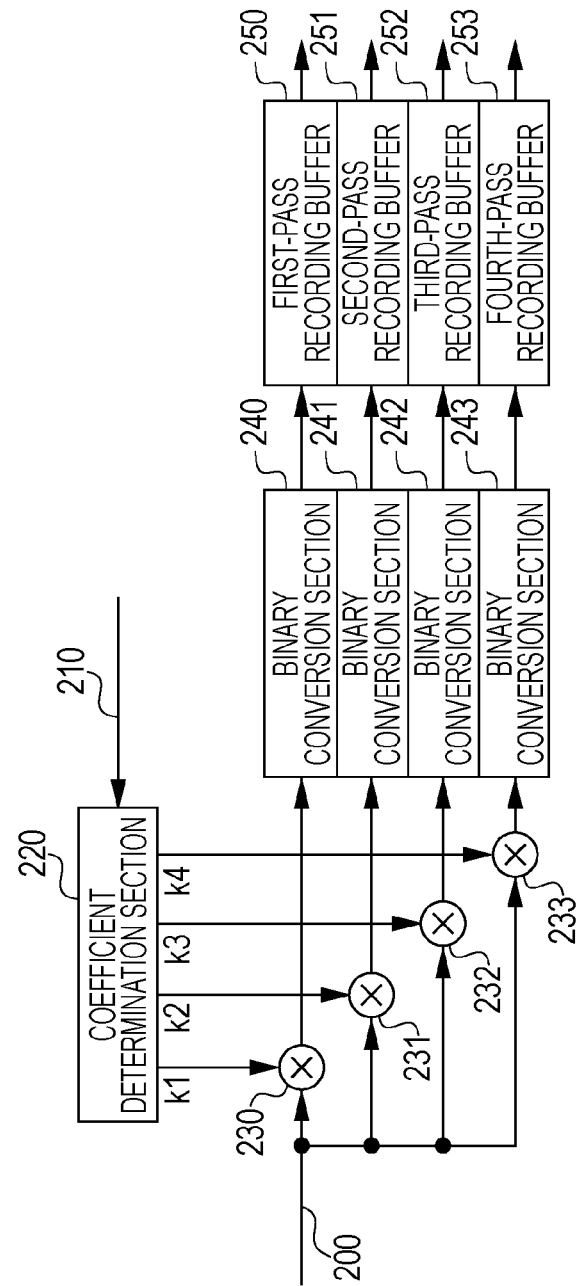
FIG. 6 is a block diagram showing an exemplary structure of a pass-distribution processing unit in an image processing unit.

FIG. 6 is a block diagram showing an exemplary structure of a pass distribution processing unit in the image processing unit 150. Here, four-pass printing is described as an example; however, an operation is basically the same with respect to printing performed in two passes, four passes, or more than four passes.

A coefficient determination section 220 determines pass distribution coefficients k1 through k4 from a recording-medium signal 210 indicating the type of recording medium detected (or specified or selected). A multiplier 230 multiplies an image signal 200 corresponding to print data by a pass distribution coefficient k1. Similarly, a multiplier 231 multiplies the image signal 200 by a pass distribution coefficient k2. A multiplier 232 multiplies the image signal 200 by a pass distribution coefficient k3. A multiplier 233 multiplies the image signal 200 by a pass distribution coefficient k4.

A binary conversion section 240 converts an image signal output from the multiplier 230 into binary data. The binary data is used to drive the printhead. Similarly, a binary conversion section 241 converts an image signal output from the multiplier 231 into binary data. A binary conversion section 242 converts an image signal output from the multiplier 232 into binary data. A binary conversion section 243 converts an image signal output from the multiplier 233 into binary data.

A first-pass recording buffer 250 holds first-pass print data (that is, print data for the first pass) output from the binary conversion section 240. Similarly, a second-pass recording buffer 251 holds second-pass print data (that is, print data for the second pass) output from the binary conversion section 241. A third-pass recording buffer 252 holds third-pass print data (that is, print data for the third pass) output from the binary conversion section 242. A fourth-pass recording buffer 253 holds fourth-pass print data (that is, print data for the fourth pass) output from the binary conversion section 243. The data held in the recording buffers 250 through 253 is output to the printhead as ejection pulses in response to movement of the carriage, on which the printhead is provided, along a scanning direction, and is used to drive the nozzles of the printhead.

Figure 7:
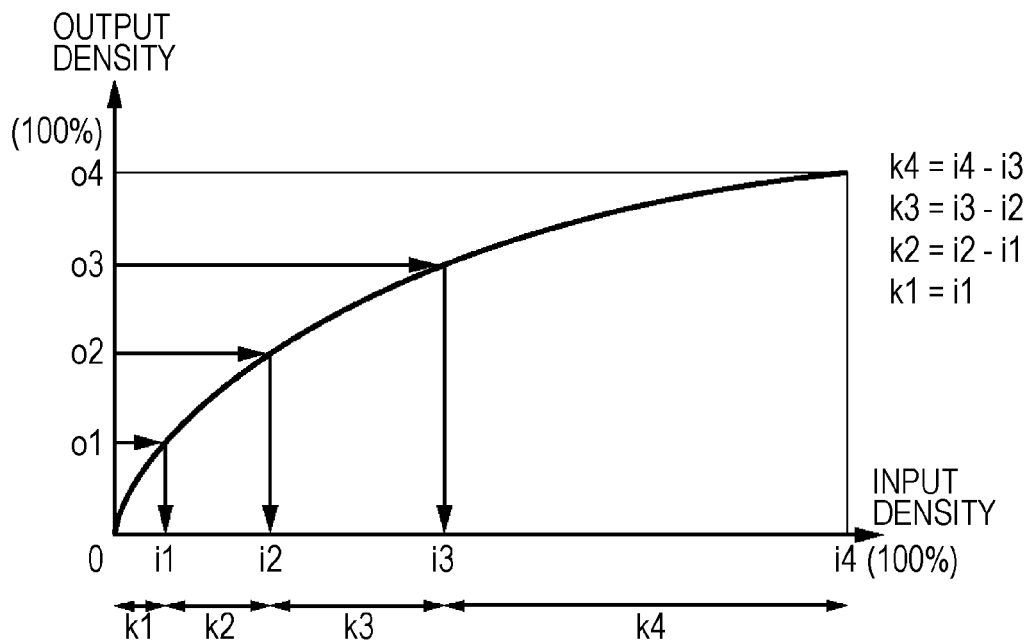
FIG. 7 is a diagram used to describe pass distribution processing.

FIG. 7 is a diagram used to describe pass distribution processing. The horizontal axis indicates input density, and the vertical axis indicates output density on a recording medium.

The coefficient determination section 220 equally divides an output density o4 (100%) corresponding to a maximum value i4 (100%) of input density into four, and determines maximum output densities o1, o2, and o3 after respective passes. The coefficient determination section 220 determines print densities (that is, input densities) i1, i2, and i3 corresponding to the maximum output densities o1, o2, and o3, respectively, from a density curve shown in FIG. 7. The coefficient determination section 220 determines density ranges (the pass distribution coefficients) k1 through k4 using the print densities i1 through i4. Here, the density range k1 is a density range for the first pass. The density range k2 is a density range for the second pass. The density range k3 is a density range for the third pass. The density range k4 is a density range for the fourth pass. That is, the pass distribution coefficient k1 is expressed by k1=i1. The pass distribution coefficient k2 is expressed by k2=i2−i1. The pass distribution coefficient k3 is expressed by k3=i3−i2. The pass distribution coefficient k4 is expressed by k4=i4−i3. It is apparent from FIG. 7 that the pass distribution coefficients have the following relationships:

$$0<k1<k2<k3<k4<1, \text{ and}$$

$$k1+k2+k3+k4=1.$$

In this way, multipass printing is performed using the pass distribution coefficients determined in a manner such that the output density is equally divided. That is, the image signals output from the multipliers 230 through 233 are image signals whose densities are lowered in response to respective pass distribution coefficients, and whose densities are different from one another. However, if printing is performed for the passes on the basis of these image signals, increases in output density are almost equal to one another in the passes. That is, the pass distribution coefficients function as density assignment coefficients for the passes.

Figure 8:
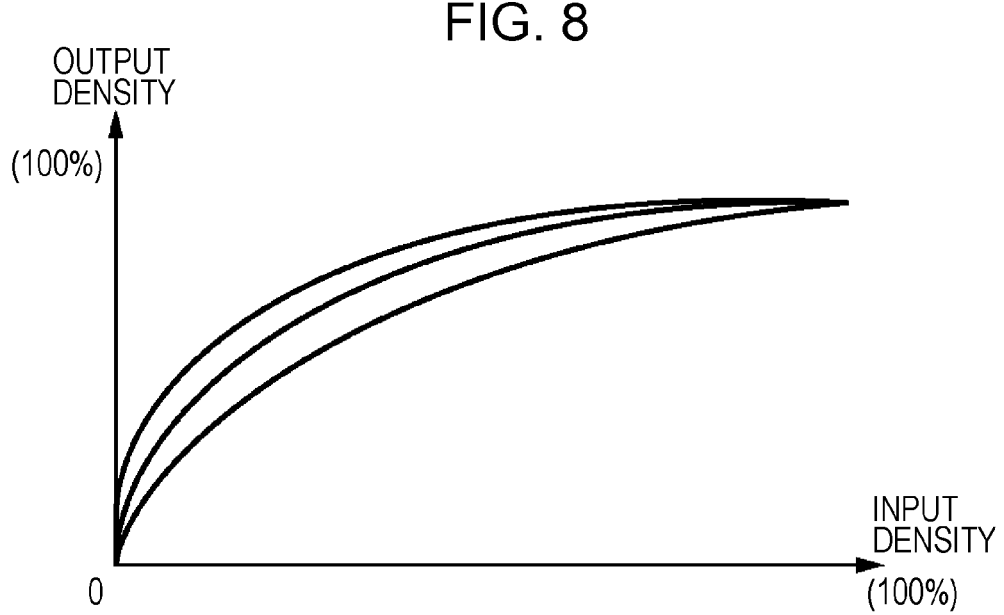
FIG. 8 is a diagram showing density characteristics with respect to types of recording medium.

As described above, the density characteristics shown in FIG. 7 vary according to the type of recording medium used in a printer in which a printhead and the type of ink are fixed. FIG. 8 is a graph of density characteristics with respect to types of recording medium. In FIG. 8, the maximum output densities are normalized at 100%. The types of recording medium each absorb a different amount of ink and have a different maximum output density, and thus the density characteristics are different.

The coefficient determination section 220 calculates the pass distribution coefficients k1 through k4 on the basis of density characteristics of the type of recording medium detected (or specified or selected). Therefore, appropriate pass distribution coefficients can be determined in accordance with the type of recording medium, and high-quality printing can be achieved by performing multipass printing appropriate for the type of recording medium.

Figure 9:
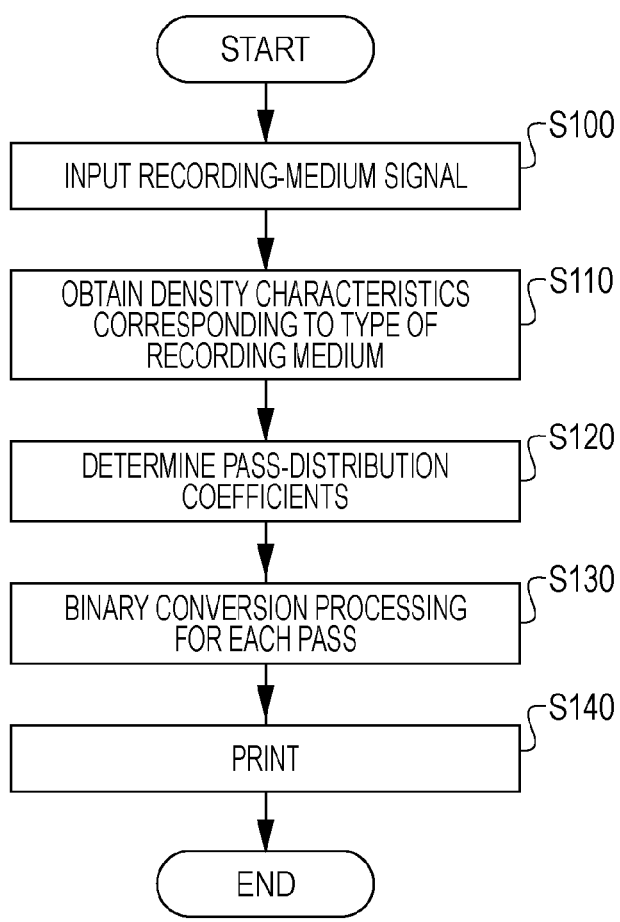
FIG. 9 is a flowchart used to describe an operation performed by the pass-distribution processing unit.

FIG. 9 is a flowchart used to describe an operation performed by the pass distribution processing unit.

In step S100, the pass distribution processing unit obtains the recording-medium signal 210 indicating the type of recording medium. In step S110, the type of recording medium is specified, and data on density characteristics corresponding to the type of recording medium is read from, for example, the ROM 110. In step S120, pass distribution coefficients corresponding to the density characteristics of the type of recording medium are determined. In step S130, print data is converted into binary data for each of the passes. In step S140, driving pulses are supplied to the printhead in order to perform printing.

An example of direct printing has been described above. If image data input from the PC 20 is printed, a printer driver executed in the PC 20 may perform the processing described above with reference to FIGS. 6 through 9 and supply, to the printer 10, print data on which the pass distribution processing has been performed.

In this way, since increases in density are almost the same among the passes, errors due to multipass printing can be more equally diffused. Thus, higher-quality printing can be realized. Furthermore, by performing pass-distribution processing appropriate for the density characteristics of a recording medium, degradation in image quality, the degradation being caused by inconsistencies in the form of streaks and inconsistencies in density, can be effectively reduced.

Second Embodiment

Image processing according to a second embodiment of the present invention will be described below. In the second embodiment, components the same as those indicated in the first embodiment will be denoted by the same reference numerals, and descriptions of the components are omitted.

In the second embodiment, an example in which pass distribution processing performed using a mask pattern the same as that used in the related art will be described.

Figure 19:
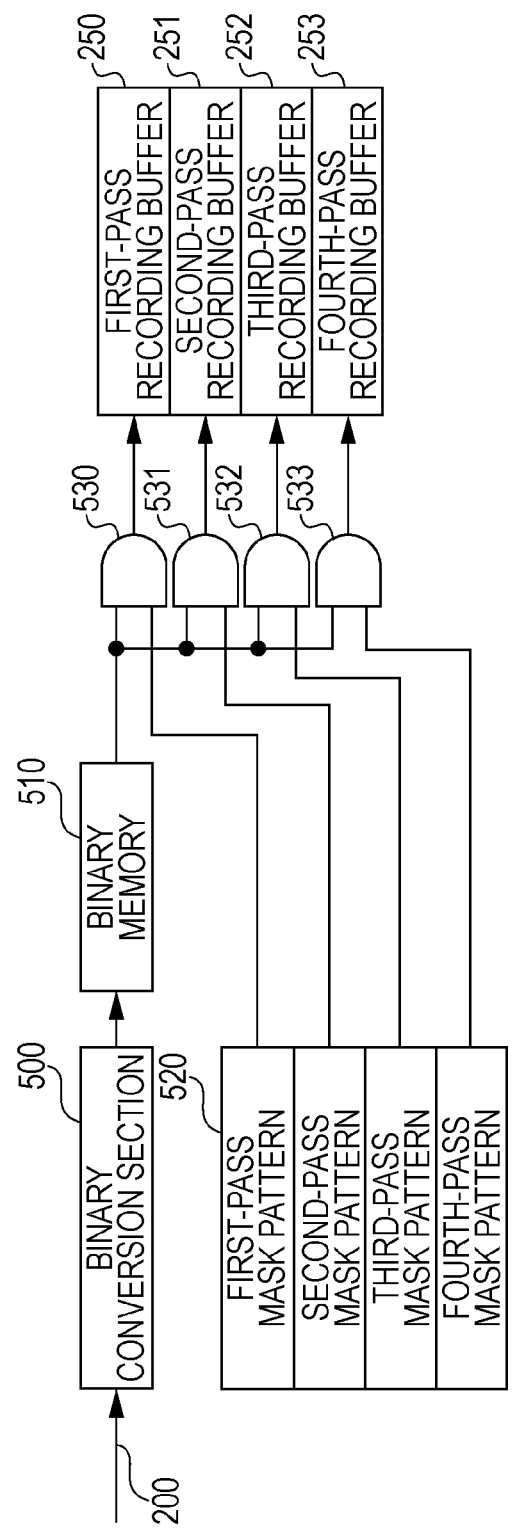
FIG. 19 is a block diagram showing an exemplary structure of a pass-distribution processing unit in the image processing unit according to the second embodiment of the present invention.

FIG. 19 is a block diagram showing an exemplary structure of the pass distribution processing unit in the image processing unit 150 according to the second embodiment. Similarly to the first embodiment, four-pass printing is described in the example; however, an operation is basically the same with respect to printing performed in two passes, four passes, or more than four passes.

A binary conversion section 500 generates print data used to drive the printhead by converting the image signal 200 into binary data, and temporarily stores the print data in a binary memory 510. The print data stored in the binary memory 510 and a mask pattern 520 are simultaneously read out, and logical multiplication of the print data and the mask pattern is performed. The resulting print data is held in recording buffers, each corresponding to one of passes. That is, an AND gate 530 performs logical multiplication of print data for a first pass area read from the binary memory 510 and a first-pass mask pattern read from the mask pattern 520 in order to generate first-pass print data. The first-pass print data supplied from the AND gate 530 is held in the first-pass recording buffer 250.

Similarly, an AND gate 531 performs logical multiplication of print data for a second pass area read from the binary memory 510 and a second-pass mask pattern read from the mask pattern 520 in order to generate second-pass print data. The second-pass print data supplied from the AND gate 531 is held in the second-pass recording buffer 251.

An AND gate 532 performs logical multiplication of print data for a third pass area read from the binary memory 510 and a third-pass mask pattern read from the mask pattern 520 in order to generate third-pass print data. The third-pass print data supplied from the AND gate 532 is held in the third-pass recording buffer 252.

An AND gate 533 performs logical multiplication of print data for a fourth pass area read from the binary memory 510 and a fourth-pass mask pattern read from the mask pattern 520 in order to generate fourth-pass print data. The fourth-pass print data supplied from the AND gate 533 is held in the fourth-pass recording buffer 253.

Figure 1:
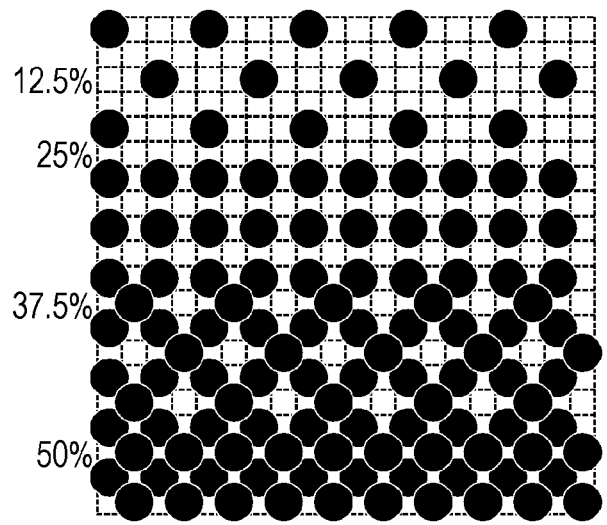
FIG. 1 is a diagram showing a pixel lattice, ink droplets, and print duties on a recording medium.
Figure 2:
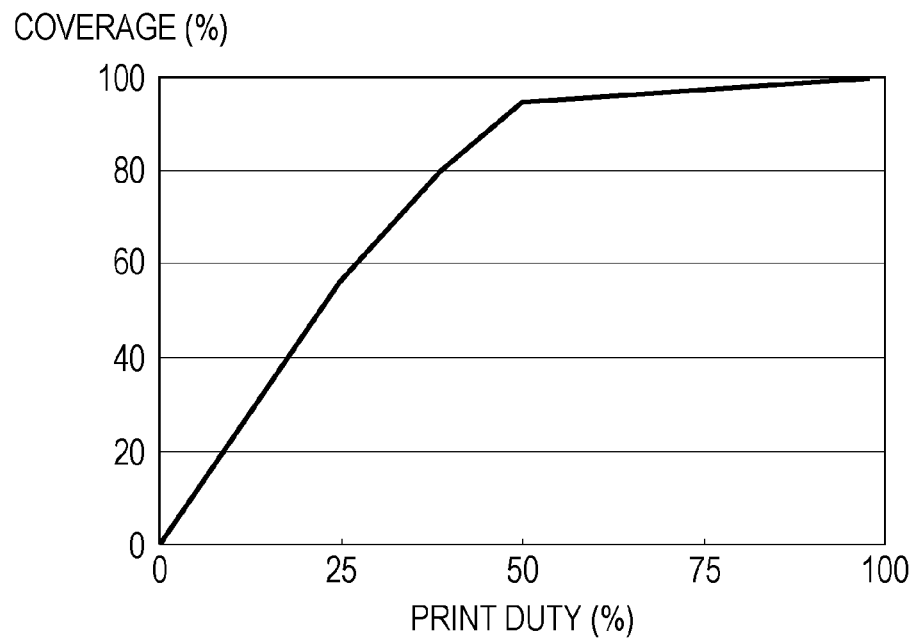
FIG. 2 is a graph of ink-droplet coverage versus print duty.
Figure 3:
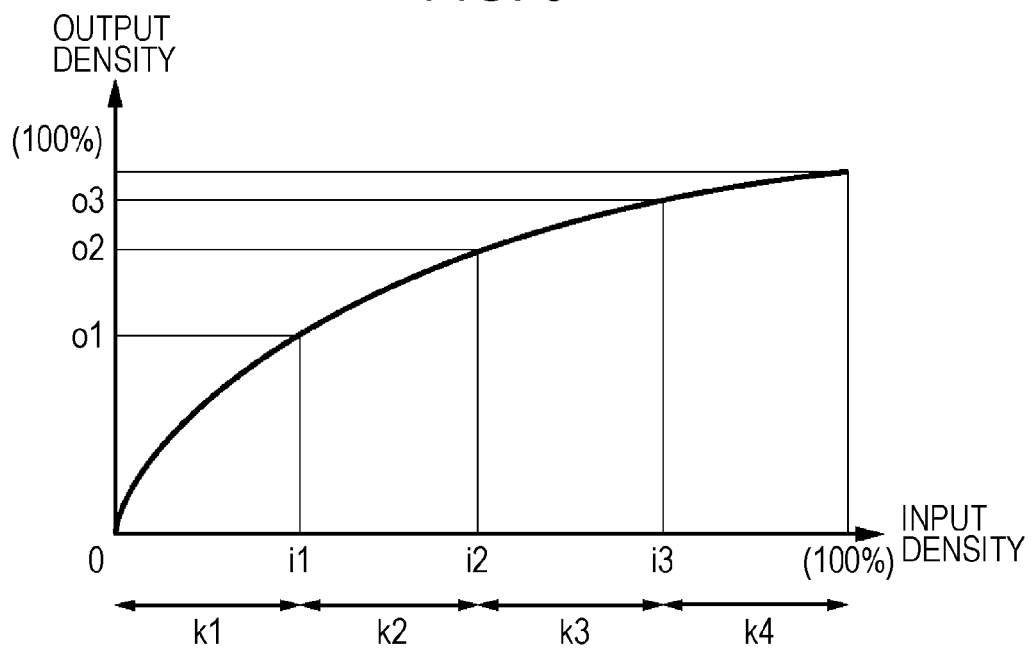
FIG. 3 is a diagram showing a relationship between density of an input image (hereinafter input density) and output density on the recording medium.
Figure 4A:
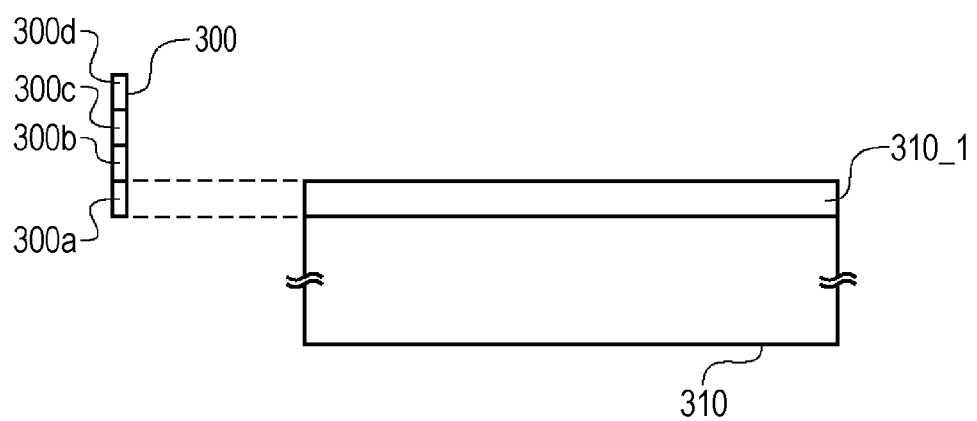
FIG. 4A is a diagram used to describe multipass printing in which a printhead scans across the recording medium a plurality of times and an image is formed on the recording medium.
Figure 4B:
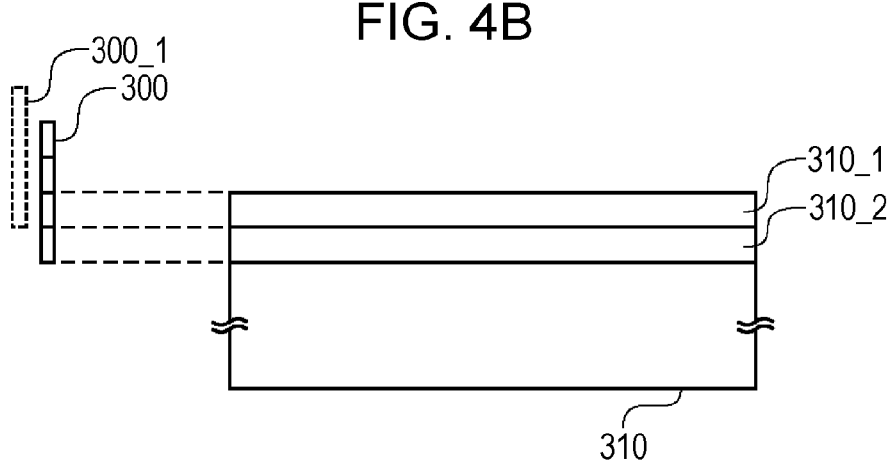
FIG. 4B is a diagram used to describe multipass printing in which a printhead scans across the recording medium a plurality of times and an image is formed on the recording medium.
Figure 4C:
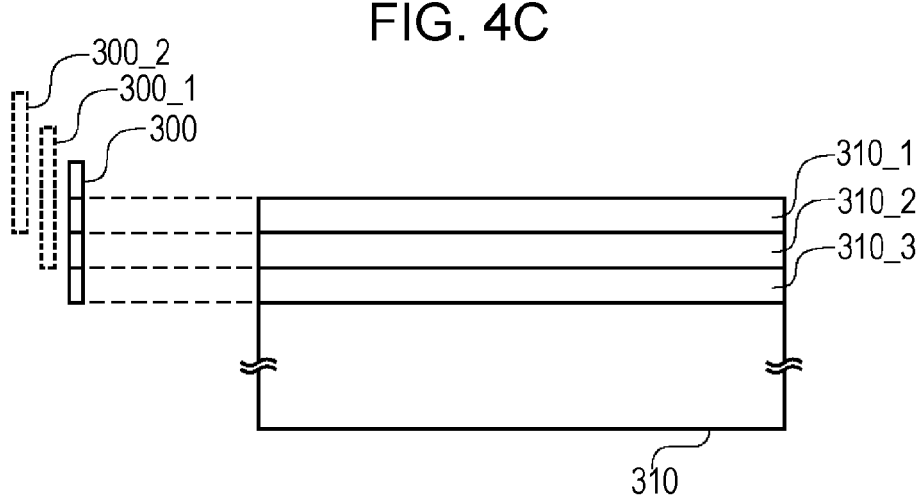
FIG. 4C is a diagram used to describe multipass printing in which a printhead scans across the recording medium a plurality of times and an image is formed on the recording medium.
Figure 4D:
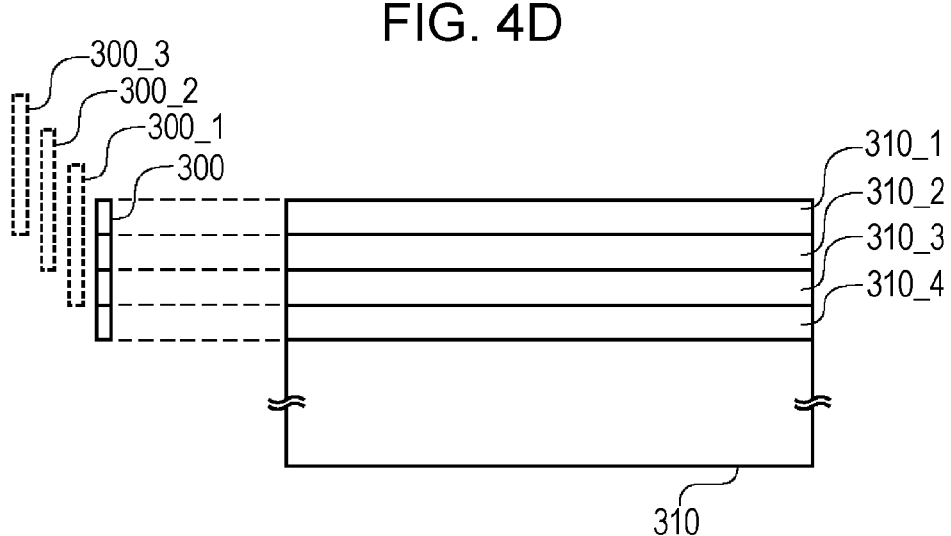
FIG. 4D is a diagram used to describe multipass printing in which a printhead scans across the recording medium a plurality of times and an image is formed on the recording medium.

As described above, the print data for each pass is generated by performing logical multiplication of binary print data and a corresponding mask pattern. The mask patterns for the passes are different from each other, and logical sum of the mask patterns for the passes is designed to cover 100% of pixels. Moreover, as described above with reference to FIG. 3, the mask patterns are designed so that an equal number of printed dots are assigned to the passes.

Figure 10:
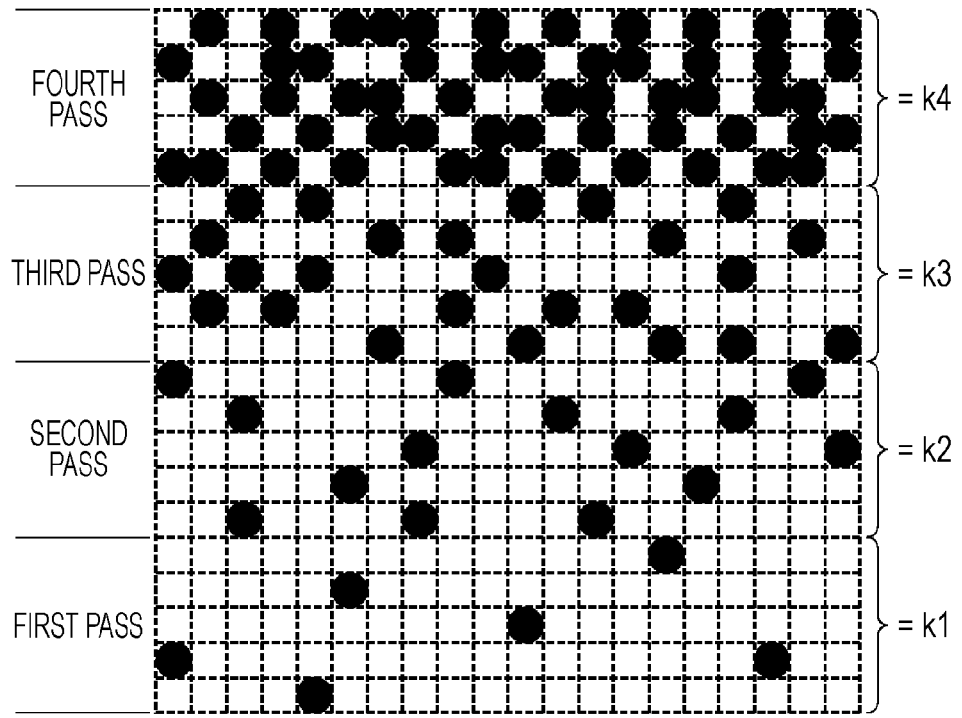
FIG. 10 is a diagram showing an exemplary mask pattern according to a second embodiment of the present invention.

FIG. 10 is a diagram showing an exemplary mask pattern according to the second embodiment of the present invention.

That is, pass distribution coefficients are determined on the basis of density characteristics in response to the type of recording medium. In accordance with the pass distribution coefficients, a ratio of ONs (that is, a dot-generation ratio) for a mask pattern is set, and a mask pattern having such a ratio of ONs is generated.

FIG. 10 shows a mask pattern for four passes. The bottom one fourth of the mask pattern shown in FIG. 10 is a first-pass mask pattern. The next one fourth of the mask pattern is a second-pass mask pattern. The next one fourth of the mask pattern is a third-pass mask pattern. The top one fourth of the mask pattern is a fourth-pass mask pattern. As described above with reference to FIG. 7, in order to distribute output density equally among the passes, the relationship between the pass distribution coefficients is k1<k2<k3<k4. These pass distribution coefficients and the ratio of ONs for the mask pattern are equivalent.

If the mask pattern corresponding to the type of a recording medium detected (or specified or selected) is set in the image processing unit 150, appropriate pass distribution processing can be performed in accordance with the type of the recording medium, and high-quality printing can be achieved by performing multipass printing appropriate for the type of the recording medium.

Third Embodiment

Image processing according to a third embodiment of the present invention will be described below. In the third embodiment, components the same as those indicated in the first embodiment will be denoted by the same reference numerals, and descriptions of the components are omitted.

Figure 11:
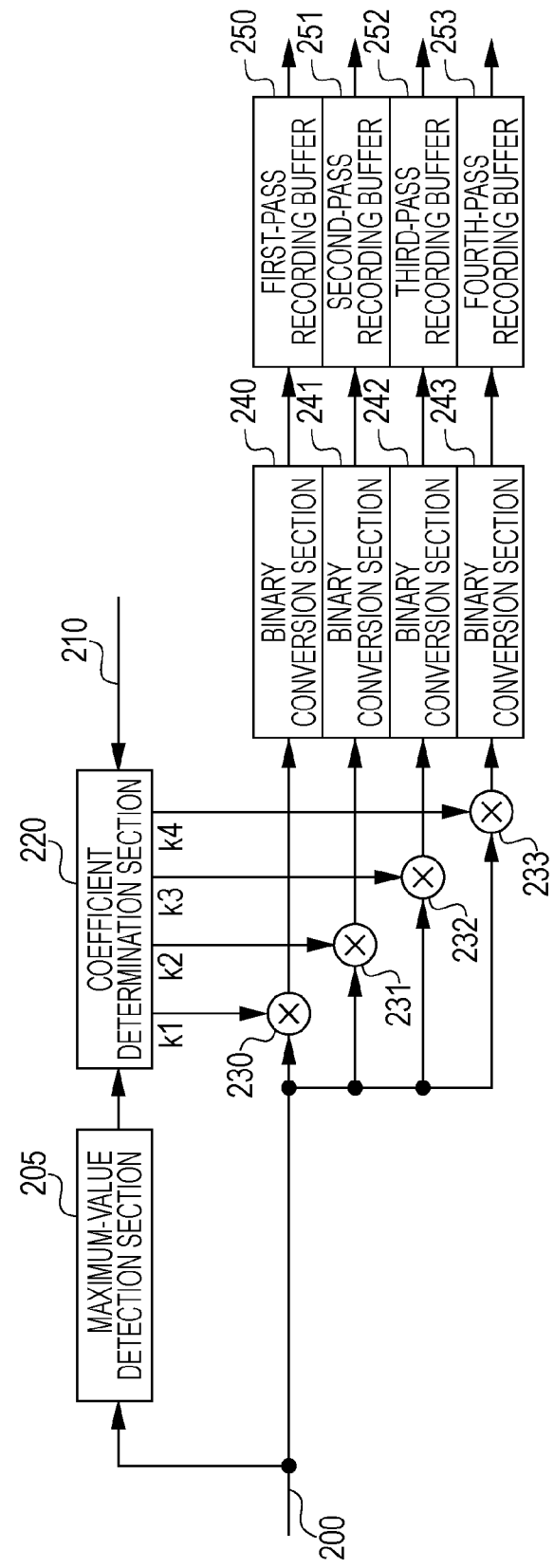
FIG. 11 is a block diagram showing an exemplary structure of the pass-distribution processing unit in the image processing unit according to a third embodiment of the present invention.

FIG. 11 is a block diagram showing an exemplary structure of the pass distribution processing unit in the image processing unit 150 according to a third embodiment of the present invention. Here, four-pass printing is described as an example; however, an operation is basically the same with respect to printing performed in two passes, four passes, or more than four passes.

The pass distribution processing unit according to the third embodiment of the present invention differs from the pass distribution processing unit according to the first embodiment shown in FIG. 6. The pass distribution processing unit according to the third embodiment includes a maximum value detection section 205 that is used to detect a dynamic range of the image signal 200. The image signal 200 is input to the maximum value detection section 205 before printing is started. The maximum value detection section 205 detects a maximum value of the image signal 200. The coefficient determination section 220 determines the pass distribution coefficients k1 through k4 from the maximum value of the image signal 200 and the recording-medium signal 210 indicating the type of the recording medium detected (or specified or selected).

Figure 12:
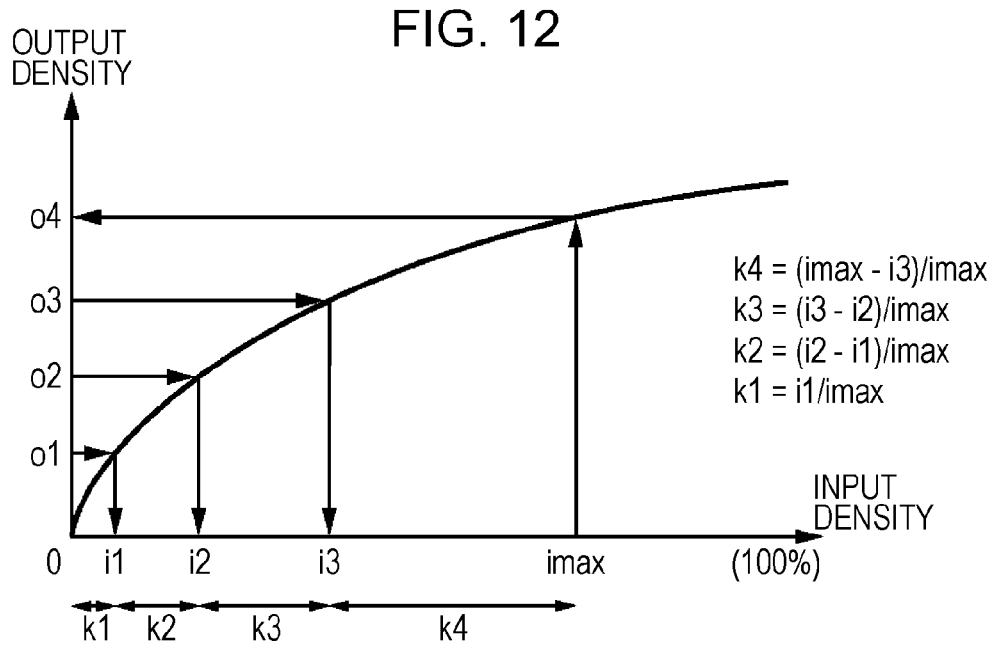
FIG. 12 is a diagram used to describe pass distribution processing.

FIG. 12 is a graph used to describe pass distribution processing. The horizontal axis indicates input density, and the vertical axis indicates output density on a recording medium.

The coefficient determination section 220 equally divides the output density o4, which corresponds to a maximum value imax (<100%) detected by the maximum value detection section 205, into four, and determines the maximum output densities o1, o2, and o3 after respective passes. The print densities i1, i2, and i3 corresponding to the maximum output densities o1, o2, and o3, respectively, are determined from a density curve shown in FIG. 12. The coefficient determination section 220 determines the density ranges (the pass distribution coefficients) k1 through k4 using the print densities i1 through i4. Here, the density range k1 is a density range for the first pass. The density range k2 is a density range for the second pass. The density range k3 is a density range for the third pass. The density range k4 is a density range for the fourth pass. That is, the pass distribution coefficient k1 is expressed by k1=i1/imax. The pass distribution coefficient k2 is expressed by k2=(i2−i1)/imax. The pass distribution coefficient k3 is expressed by k3=(i3−i2)/imax. The pass distribution coefficient k4 is expressed by k4=(imax−i3)/imax. It is apparent from FIG. 12 that the pass distribution coefficients have the following relationships:

0<k1<k2<k3<k4<1, and k1+k2+k3+k4=1.

In this way, multipass printing is performed using the pass distribution coefficients determined in a manner such that the output density, which corresponds to the maximum value imax (≤100%) detected by the maximum value detection section 205, is equally divided. That is, the image signals output from the multipliers 230 through 233 are image signals whose densities are lowered according to respective pass distribution coefficients, and whose densities are different from one another. However, if printing is performed for the passes using these image signals, increases in output density are almost equal to one another in the passes. That is, the pass distribution coefficients function as density assignment coefficients for the passes.

In the case of the first embodiment, the pass distribution coefficients are simply determined using the relationship between the maximum value i (100%) of input density and the maximum output density on the recording medium. Thus, if an image whose density is low over the entirety thereof is printed, printing is mostly performed by using the first and second passes, and the third and fourth passes cannot be effectively utilized. In contrast, in the case of the third embodiment, the pass distribution coefficients are determined using the relationship between the maximum value imax (≤100%) of the image signal 200 and the maximum output density on the recording medium. Thus, the second and later passes can also be effectively utilized, and errors due to multipass printing can be more equally diffused.

Figure 13:
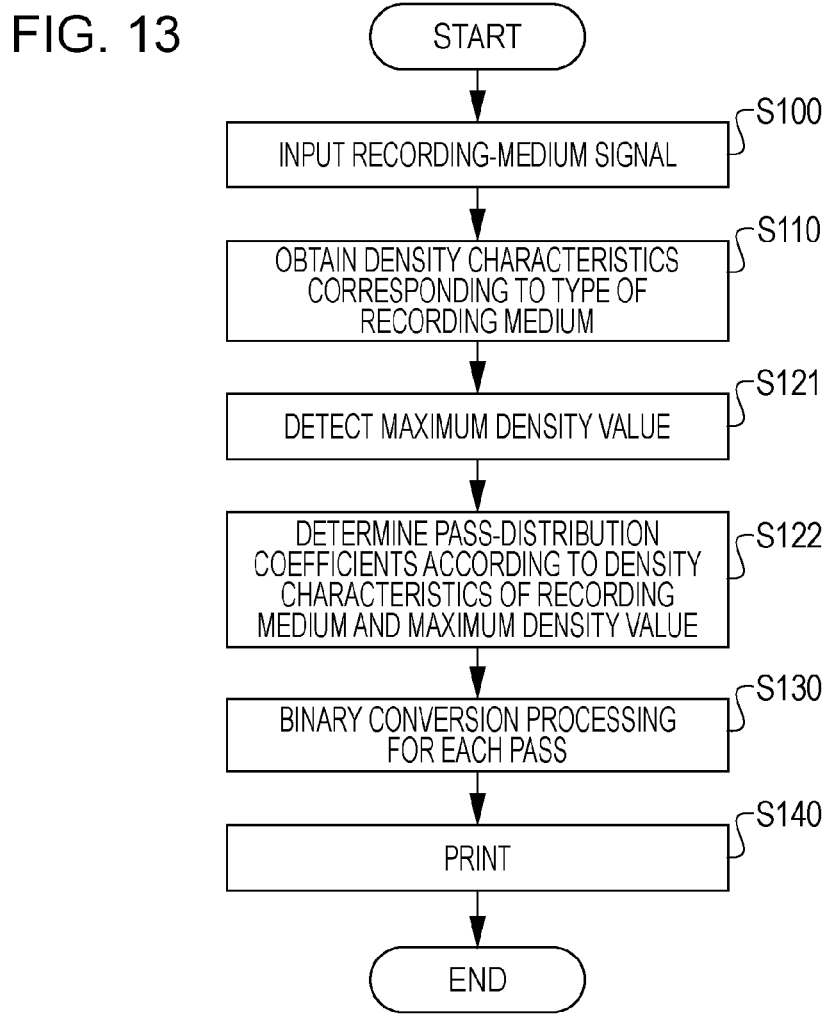
FIG. 13 is a flowchart used to describe an operation performed by the pass-distribution processing unit.

FIG. 13 is a flowchart used to describe an operation performed by the pass distribution processing unit.

In the following two points, the operation performed by the pass distribution processing unit according to the third embodiment differs from the operation performed by the pass distribution processing unit according to the first embodiment as shown in FIG. 9. One of the two points is that, in step S121, data concerning the image signal 200 is scanned and a maximum value (the maximum density value imax) is detected from the data concerning the image signal 200. The other point is that, in step S122, the pass distribution coefficients are determined according to the maximum density value imax and the density characteristics of the recording medium.

Figure 14:
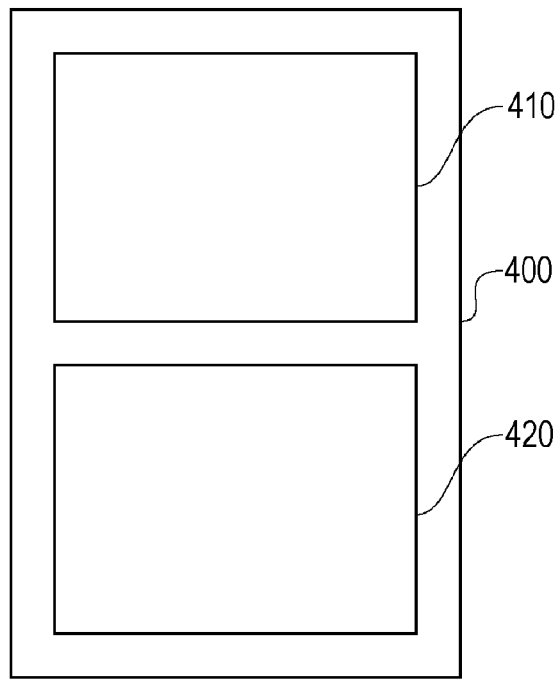
FIG. 14 is a diagram showing recording areas on the recording medium.
Figure 15:
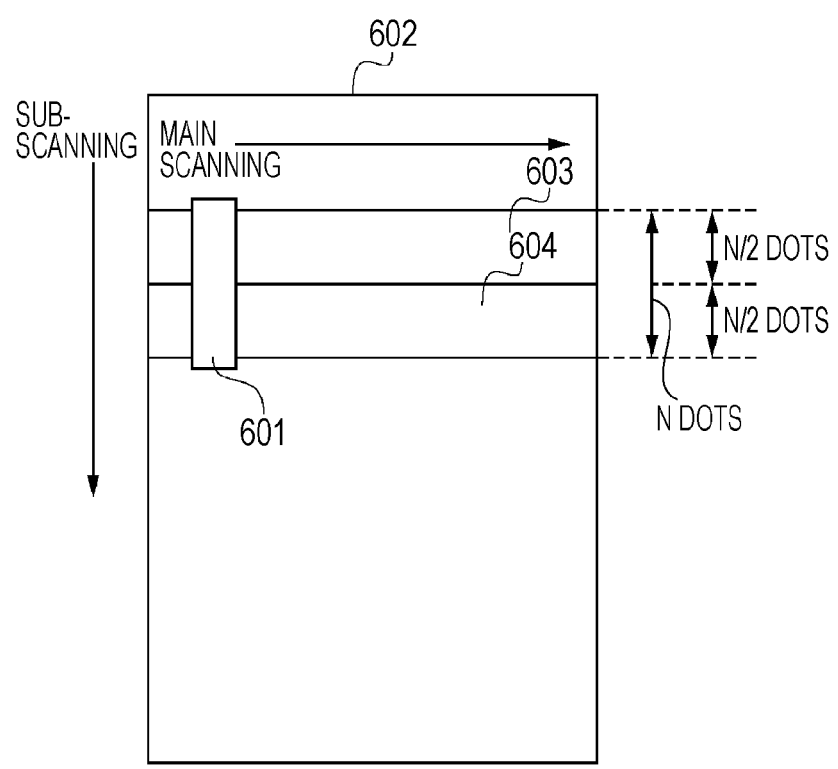
FIG. 15 is a diagram showing a case in which an image is recorded by using two passes.

FIG. 14 is a diagram showing recording areas on a recording medium 400. Different images are printed on a first recording area 410 and a second recording area 420 of the recording medium 400.

In this case, for each of the first recording area 410 and the second recording area 420, a maximum value (the maximum density value imax) of the image signal 200 is detected. Pass distribution coefficients for the first recording area 410 are determined according to density characteristics of the recording medium 400 and a maximum density value imax1 for the first recording area 410, and printing is performed. Pass distribution coefficients for the second recording area 420 are determined according to the density characteristics of the recording medium 400 and a maximum density value imax2 for the second recording area 420, and printing is performed.

In this way, for each of the first recording area 410 and the second recording area 420, since the pass distribution coefficients can be determined using a corresponding maximum density value, the second and later passes can also be effectively utilized, and errors due to multipass printing can be more equally diffused.

Here, a region segmentation method is not limited to the method as shown in FIG. 14. As long as a method in which an area is divided along a main scanning direction into a plurality of regions is used, the area may be divided at a position between images or within one image. The number of regions into which an area is divided is not limited. That is, appropriate pass distribution coefficients can be determined for the regions.

Fourth Embodiment

Image processing according to a fourth embodiment of the present invention will be described below. In the fourth embodiment, components the same as those indicated in the first embodiment will be denoted by the same reference numerals, and descriptions of the components are omitted.

Figure 16:
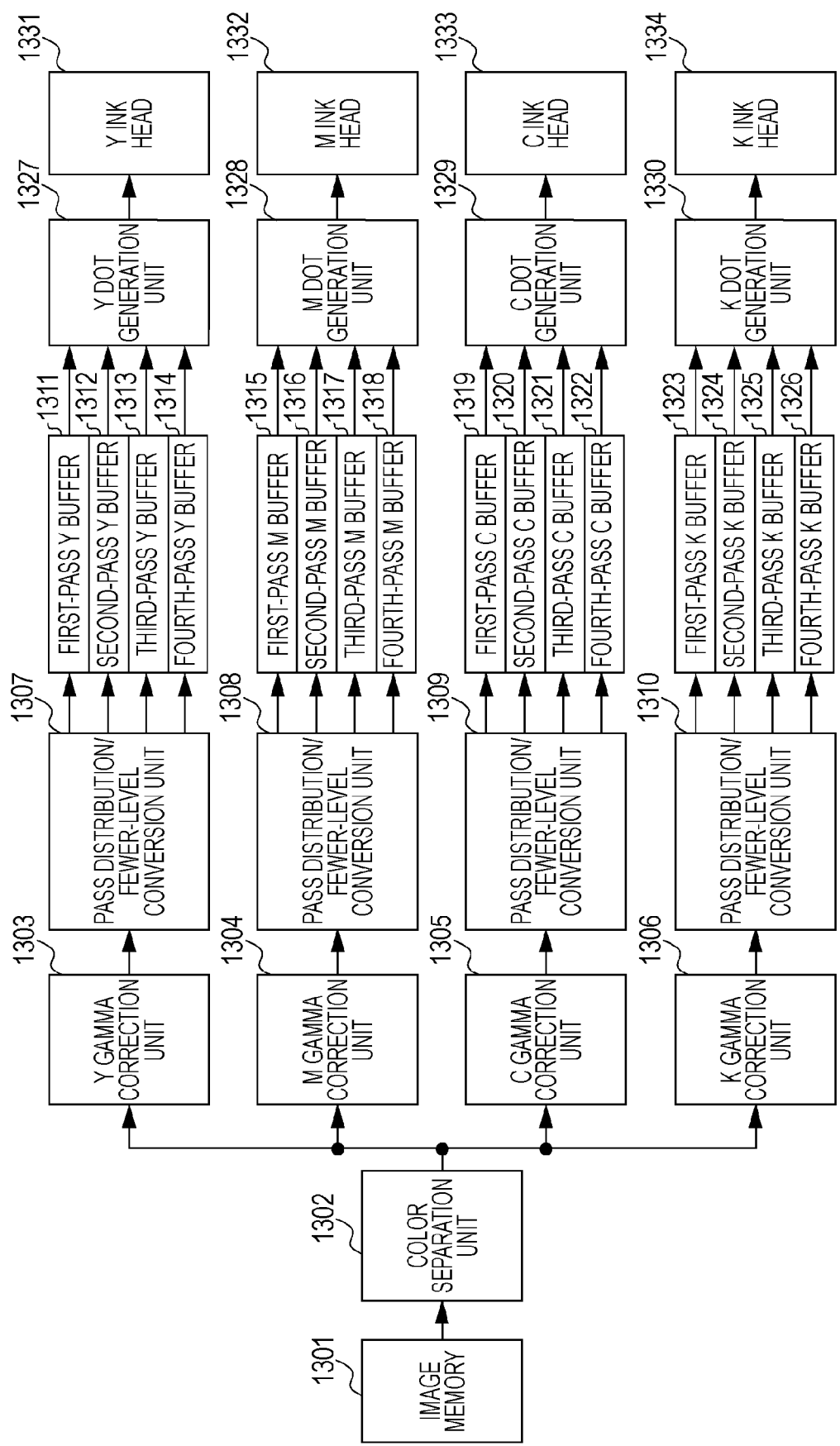
FIG. 16 is a block diagram showing an exemplary structure of an image processing apparatus according to a fourth embodiment of the present invention.

FIG. 16 is a block diagram showing an exemplary structure of an image processing apparatus according to the fourth embodiment.

An image memory 1301 is used to store RGB multilevel image data to be printed. A color separation unit 1302 separates the image data stored in the image memory 1301 into multilevel data corresponding to ink colors (recording colors). In the fourth embodiment, RGB data is separated into Y multilevel data, M multilevel data, C multilevel data, and K multilevel data.

A Y gamma correction unit 1303, an M gamma correction unit 1304, a C gamma correction unit 1305, and a K gamma correction unit 1306 perform gamma correction on the Y multilevel data, the M multilevel data, the C multilevel data, and the K multilevel data, respectively. When performing the gamma correction, it is assumed that correction in density is performed in a manner such that a resolution of dots and a coverage of the dots match. (If a resolution of dots and a coverage of the dots match in a recording apparatus, such a recording apparatus is regarded as being an ideal recording apparatus.)

A pass distribution/fewer-level conversion unit 1307 performs pass distribution processing on the Y multilevel data on which the gamma correction has been performed and whose density changes linearly, and converts the Y multilevel data into fewer-level data by halftoning such as error diffusion. Similarly, a pass distribution/fewer-level conversion unit 1308 performs pass distribution processing on the M multilevel data on which gamma correction has been performed and whose density changes linearly, and converts the M multilevel data into fewer-level data by halftoning such as error diffusion. A pass distribution/fewer-level conversion unit 1309 performs pass distribution processing on the C multilevel data on which gamma correction has been performed and whose density changes linearly, and converts the C multilevel data into fewer-level data by halftoning such as error diffusion. A pass distribution/fewer-level conversion unit 1310 performs pass distribution processing on the K multilevel data on which gamma correction has been performed and whose density changes linearly, and converts the K multilevel data into fewer-level data by halftoning such as error diffusion.

A first-pass Y buffer 1311, a second-pass Y buffer 1312, a third-pass Y buffer 1313, and a fourth-pass Y buffer 1314 are used to hold first-pass Y data, second-pass Y data, third-pass Y data, and fourth-pass Y data, respectively. The first-pass Y data, second-pass Y data, third-pass Y data, and fourth-pass Y data are data on which the pass distribution processing has been performed and which have been converted to have fewer levels. A first-pass M buffer 1315, a second-pass M buffer 1316, a third-pass M buffer 1317, and a fourth-pass M buffer 1318 are used to hold first-pass M data, second-pass M data, third-pass M data, and fourth-pass M data, respectively. The first-pass M data, second-pass M data, third-pass M data, and fourth-pass M data are data on which the pass distribution processing has been performed and which have been converted to have fewer levels. A first-pass C buffer 1319, a second-pass C buffer 1320, a third-pass C buffer 1321, and a fourth-pass C buffer 1322 are used to hold first-pass C data, second-pass C data, third-pass C data, and fourth-pass C data, respectively. The first-pass C data, second-pass C data, third-pass C data, and fourth-pass C data are data on which the pass distribution processing has been performed and which have been converted to have fewer levels. A first-pass K buffer 1323, a second-pass K buffer 1324, a third-pass K buffer 1325, and a fourth-pass K buffer 1326 are used to hold first-pass K data, second-pass K data, third-pass K data, and fourth-pass K data, respectively. The first-pass K data, second-pass K data, third-pass K data, and fourth-pass K data are data on which the pass distribution processing has been performed and which have been converted to have fewer levels.

A Y dot generation unit 1327, an M dot generation unit 1328, a C dot generation unit 1329, and a K dot generation unit 1330 each generate, for each of the passes, a dot pulse using image data for the pass. A Y ink head 1331, an M ink head 1332, a C ink head 1333, and a K ink head 1334 each eject ink from nozzles in accordance with a corresponding dot pulse. The Y ink head 1331, the M ink head 1332, the C ink head 1333, and the K ink head 1334 perform multipass printing by alternately performing dot recording processing in each of scans in a time-sharing manner.

Figure 17:
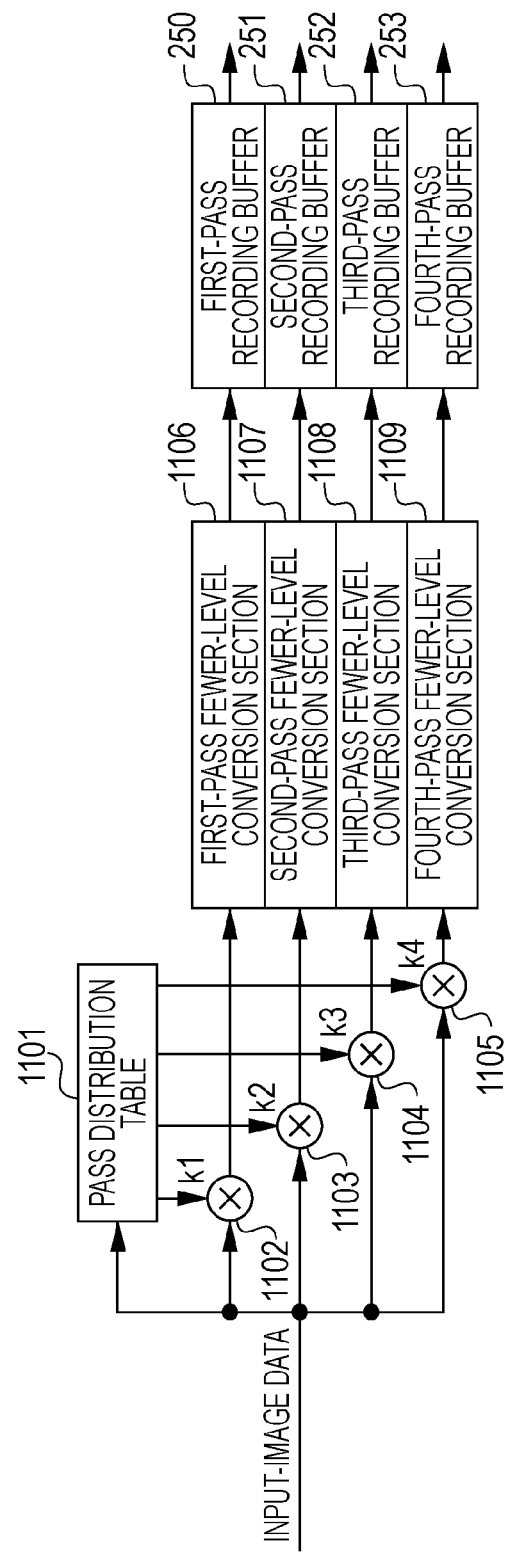
FIG. 17 is a block diagram showing an example of a detailed structure of a pass distribution/fewer-level conversion unit.

FIG. 17 is a block diagram showing an example of a detailed structure of the pass distribution/fewer-level conversion units 1307 through 1310.

A pass distribution table 1101 outputs, for each of pixels of input image data, pass distribution coefficients k1 through k4 used to distribute the input image data among the first pass through the fourth pass in accordance with output-density characteristics obtained from the input image data. The pass distribution coefficients k1 through k4 are determined for each of the pixels of the input image data. Multipliers 1102 through 1105 multiply, for each of the pixels, the input image data by the pass distribution coefficients input from the pass distribution table 1101. A multiplied result supplied from the multiplier 1102 is output to a first-pass fewer-level conversion section 1106. A multiplied result supplied from the multiplier 1103 is output to a second-pass fewer-level conversion section 1107. A multiplied result supplied from the multiplier 1104 is output to a third-pass fewer-level conversion section 1108. A multiplied result supplied from the multiplier 1105 is output to a fourth-pass fewer-level conversion section 1109.

Figure 18:
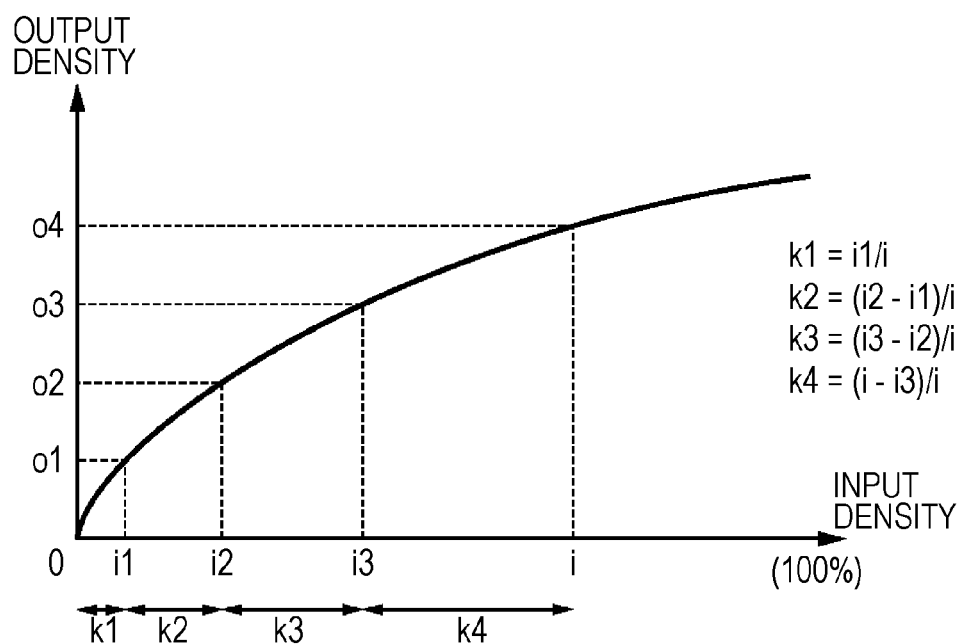
FIG. 18 is a diagram used to describe pass distribution processing.

FIG. 18 is a graph used to describe the pass distribution processing. The horizontal axis indicates input density, and the vertical axis indicates output density on a recording medium.

The pass distribution table 1101 outputs the pass distribution coefficients k1 through k4 corresponding to certain density ranges. The density ranges are determined using the print densities i1, i2, and i3, which are the input densities corresponding to the output densities o1, o2, and o3. The output densities o1, o2, and o3 are obtained by equally dividing the output density o4 corresponding to a density value i (<100%) of the input image data into four ranges. That is, the pass distribution coefficient k1 is expressed by k1=i1/i. The pass distribution coefficient k2 is expressed by k2=(i2−i1)/i. The pass distribution coefficient k3 is expressed by k3=(i3−i2)/i. The pass distribution coefficient k4 is expressed by k4=(i−i3)/i. FIG. 12 shows that the pass distribution coefficients k1 through k4 have the following relationships:

$$0 < k1 < k2 < k3 < k4 < 1, \text{ and}$$

$$k1 + k2 + k3 + k4 = 1.$$

Here, the output density o4 may be modified by weights corresponding to the passes and accordingly distributed among the passes instead of being equally distributed.

In this way, multipass printing is performed using the pass distribution coefficients determined in a manner such that the output density corresponding to the density value i (≤100%) of the input image data is equally divided. That is, image signals output from the multipliers 1102 through 1105 are image signals whose densities are lowered by using respective pass distribution coefficients, and whose densities are different from one another. However, if printing is performed in the passes using these image signals, increases in output density are almost equal to one another in the passes. That is, the pass distribution coefficients function as density assignment coefficients for the passes.

Other Embodiment

The present invention may be applied to a system including a plurality of apparatuses (for example, a computer, an interface apparatus, a reader, and a printer), or may be applied to a single apparatus (for example, a copier, a facsimile, and a control apparatus).

The present invention may be embodied by supplying, to a system or an apparatus, a storage medium on which a computer program allowing functions according to the above-described embodiments to be realized is recorded and by executing the computer program using a computer (a CPU or microprocessing unit (MPU)) of the system or apparatus. In this case, software read from the storage medium allows the functions according to the above-described embodiments to be realized. Thus, the computer program and the computer-readable storage medium in which the computer program is stored fall within the scope of the present invention.

Instead of realizing the functions according to the embodiments by executing the computer program read, for example, an operating system (OS) and/or certain programs running on the computer may actually execute part of or the entire processing according to instructions provided by executing the computer program to achieve the functions according to the embodiments. This also falls within the scope of the present invention.

Furthermore, the computer program may be written in a memory of a device such as a function extension card or function extension unit connected to the computer so that a CPU or the like of a certain device may actually execute part of or the entire processing according to the instructions provided by executing the computer program. This also falls within the scope of the present invention.

In a case in which the present invention is applied to the storage medium described above, the storage medium is used to store a computer program corresponding to or related to the flowcharts described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-160682 filed Jun. 18, 2007, which is hereby incorporated by reference herein in its entirety.

What is claimed is:

1. An image processing apparatus for generating image data used to form an image on a recording medium in a plurality of scans across a recording area of the recording medium, the plurality of scans including a first scan, a second scan, ..., and an Nth scan (3≤N), and the plurality of scans being performed in order of the first scan, the second scan, ..., and the Nth scan, the image processing apparatus comprising:

a determination unit configured to determine distribution coefficients k1, ..., kN to specify assignments of input density to the respective plurality of scans based on a characteristic between the input density, and output density of dots formed on the recording medium by ink in the recording area based on the input density; and a generation unit configured to generate image data for each of the plurality of scans from input image data based on the distribution coefficients, wherein the distribution coefficients k1, ..., kN have a relationship k1<k2<...<kN, wherein the determination unit determines the distribution coefficients based on input densities corresponding respectively to maximum output densities after the respective plurality of scans, the maximum output densities being obtained by equally dividing the output density of dots formed on the recording medium by ink in the recording area based on the input density, and wherein, among the plurality of scans performed in the order of the first scan, the second scan, ..., and the Nth scan, an input density to be assigned to a first scan of concern is lower than those of the subsequent plurality of scans.

2. The image processing apparatus according to claim 1, wherein the determination unit determines the distribution coefficients in a manner such that, for the scans, increases in density in the recording area are almost the same.

3. The image processing apparatus according to claim 1, wherein a range of a possible density of the image data is assigned to the scans.

4. The image processing apparatus according to claim 1, wherein the generation unit generates image data for each of the scans by multiplying the input image data by the distribution coefficient corresponding to the respective scan.

5. The imagine processing apparatus according to claim 1, further comprising: an obtaining unit configured to obtain information indicating a type of the recording medium, wherein the characteristic [obtained by the obtaining unit] depends on the recording medium indicated by the information.

6. A method for generating image data used to form an image on a recording medium in a plurality of scans across a recording area of the recording medium, the plurality of scans including a first scan, a second scan, ..., and an Nth scan (3≤N), and the plurality of scans being performed in order of the first scan, the second scan, ..., and the Nth scan, the method comprising:

determining distribution coefficients k1, ...,kN to specify assignments of input density to the respective plurality of scans based on a characteristic between the input density, and output density of dots formed on the recording medium by ink in the recording area based on the input density; and generating image data for each of the plurality of scans from input image data based on the distribution coefficients, wherein the distribution coefficients k1, ..., kN have a relationship k1 <k2<...<kN, wherein the determination unit determines the distribution coefficients based on input densities corresponding respectively to maximum output densities after the respective plurality of scans, the maximum output densities being obtained by equally dividing the output density of dots formed on the recording medium by ink in the recording area based on the input density, and wherein, among the plurality of scans performed in the order of the first scan, the second scan, ..., and the Nth scan, an input density to be assigned to a first scan of concern is lower than those of the subsequent plurality of scans.

7. A non-transitory computer-readable storage medium storing a computer program used to control an image processing apparatus, the computer program allowing the image processing apparatus to function as the units according to claim 1.

8. The image processing apparatus according to claim 1, wherein a range of density of the input image data up to a maximum value is assigned to the scans.

9. An image processing apparatus for generating image data used to form an image on a recording medium in N times ($N \geq 2$, and N is a natural number) scans across a recording area of the recording medium, the image processing apparatus comprising:

an obtaining unit configured to obtain distribution coefficients corresponding to the recording medium;

a generation unit configured to generate, from input image data indicating input density, image data for each of the N times scans based on the distribution coefficients obtained by the obtaining unit in a manner such that output density of dots formed on the recording medium by ink in the recording area based on the input density increases almost equally among the N times scans; and a quantizing unit configured to quantize the image data for each of the N times scans, wherein the distribution coefficients are determined based on input densities corresponding respectively to maximum output densities after the respective N times scans, the maximum output densities being obtained by equally dividing the output density of dots formed on the recording medium by ink in the recording area based on the input density.

10. An image processing method for generating image data used to form an image on a recording medium in a plurality of N times ($N \geq 2$, and N is a natural number) scans across a recording area of the recording medium, the image processing method comprising:

obtaining distribution coefficients corresponding to the recording medium;

generating, from input image data indicating input density, image data for each of the N times scans based on the obtained distribution coefficients in a manner such that output density of dots formed on the recording medium by ink in the recording area based on the input density increases almost equally among the N times scans; and quantizing the image data for each of the N times scans, wherein the distribution coefficients are determined based on input densities corresponding respectively to maximum output densities after the respective N times scans, the maximum output densities being obtained by equally dividing the output density of dots formed on the recording medium by ink in the recording area based on the input density.

* * * * *